United States Patent [19]

Dirr

[11] Patent Number: 4,675,721

[45] Date of Patent: Jun. 23, 1987

[54] METHOD FOR CODED TRANSMISSION OF COLOR TELEVISION SIGNALS

[76] Inventor: Josef Dirr, Neufahrnerstr. 5, Munich, Fed. Rep. of Germany

[21] Appl. No.: 821,128

[22] Filed: Jan. 22, 1986

Related U.S. Application Data

[63] Continuation-in-part of Ser. No. 519,657, Aug. 2, 1983, abandoned.

[30] Foreign Application Priority Data

Aug. 4, 1982 [DE] Fed. Rep. of Germany ....... 3229139
Aug. 11, 1982 [DE] Fed. Rep. of Germany ....... 3229888
May 30, 1983 [DE] Fed. Rep. of Germany ....... 3319588

[51] Int. Cl.⁴ .................. H04N 11/06; H04N 7/08
[52] U.S. Cl. ...................... 358/13; 358/12; 358/16; 358/142
[58] Field of Search .............. 358/12, 13, 14, 15, 358/16, 142; 370/20, 77; 375/17, 37, 39

[56] References Cited

U.S. PATENT DOCUMENTS 4,015,204  3/1977  Miyazawa ............... 375/38

FOREIGN PATENT DOCUMENTS 2506402  2/1975  Fed. Rep. of Germany .

OTHER PUBLICATIONS

"Pulstechnik", by Kerstein and Larsen, *Springer-Verlag*, Berlin, 1975, pp. 263 & 264.
RCA Review, Dec. 1949, pp. 506–513.

*Primary Examiner*—James J. Groody
*Assistant Examiner*—Robert Michael Bauer
*Attorney, Agent, or Firm*—Edwin E. Greigg

[57] ABSTRACT

In a method for transmission of color television signals, at least two color information containing signals are coded using code elements comprised of a half period or a full period of a sine wave, the sequence of code elements forming at least one essentially sinusoidal code signal stream. In one embodiment, the code elements form binary code words for conveying different types of information, as hue and saturation of a color picture element. Alternatively, each code element may have an amplitude related to the value of the information to be transmitted, as saturation of a specific primary color. Each code word may comprise a plurality of portions related to different types of information, as different primary colors, audio information and the like. Two code signal streams each forming a sine wave of the same predetermined frequency may be phase displaced by 90 degrees, superimposed and employed in a composite video signal e.g. instead of and at the same frequency as an usual color subcarrier wave.

10 Claims, 33 Drawing Figures

METHOD FOR CODED TRANSMISSION OF COLOR TELEVISION SIGNALS

This is a continuation-in-part of application Ser. No. 519,657 filed Aug. 2, 1983 now abandoned.

The present invention relates to the art of transmitting information by coded signals, more specifically to the transmission of at least partially coded color picture information.

BACKGROUND OF THE INVENTION

In color television systems generally a radio frequency carrier wave is modulated with an unipolar composite video signal which includes synchronizing signal components, blanking components, picture or luminance components, and chrominance components comprised by a color subcarrier quadrature modulated with two color signals.

It has also been proposed, to digitally code the composite color signal before modulating the carrier wave, because digitally coded signals are less prone to transmission errors than analog signals. At the receiving end, the original analog composite video signal is reconstructed from the transmitted digital signal by decoding and processed in analog manner as well known in the color television receiver art.

My own German patent No. 30 10 938 describes a method of digital coding using code elements formed by a half or a full period of a sine wave.

The known systems for producing and processing the composite video signal at the transmitting and receiving ends are relatively complicated, specifically if measures are to be taken, as in the PAL and SECAM systems for avoiding color errors by phase distortions in the course of the transmission.

SHORT SUMMARY OF THE INVENTION

It is an object of the invention, to provide a method for transmitting color picture signals with high color fidelity using relatively simple and inexpensive apparatus at the transmitting and receiving ends of the transmission path.

A further object of the invention is to provide a method for transmission of coded chrominance signals which is simple and avoids color errors.

The present invention is based on a method of transmitting color picture information wherein the color image information is transmitted by using three component signals of which at least two signals carry color information. Coded signals are used, which comprise code elements which consist either of a full or a half period of an essentially sinusoidal alternating current signal and wherein binary values 0 and 1 are represented by code elements of a first and a second different nominal amplitude, of which one is preferably at least twice as large as the other.

In accordance with another aspect of the present invention, the color information is transmitted by first and second coded signals of which the first represents the angle and the second the magnitude of a color vector representing, in the well known color circle, the color of a color picture element (color pixel) to be transmitted.

Further aspects, features and benefits of the invention will become apparent when reading the following detailed description of preferred embodiments thereof.

First, the type of codes are explained, which are used in the color information transmission method according to the present invention. The present codes use code elements consisting of a period or a half period of an essentially sinusoidal alternating current signal. The use of code elements which consist of a full a.c. period has the advantage that the coded signal is symmetrical with respect to zero and, thus, comprises no direct current component, which is of advantage e.g. when the signals are to be transmitted through a cable.

Figure 1A:
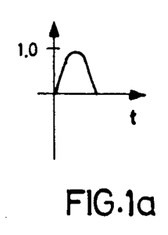
FIGS. 1a to 1d show code elements of a first type which may be used in the present method.
Figure 1B:
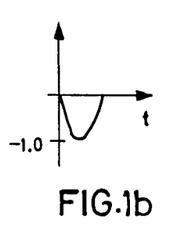
Figure 1C:
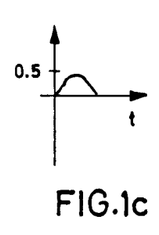
Figure 1D:
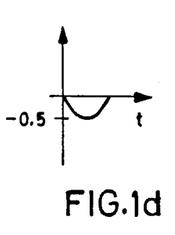
Figure 2:
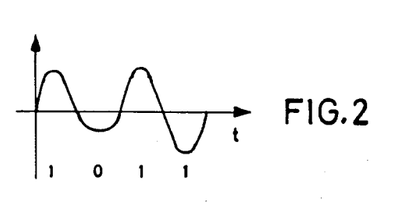
FIG. 2 shows an example of a 4-bit code word consisting of the code elements shown in FIG. 1.

In the case of digital coding, specifically binary coding, a first binary value, as "1" is represented by a first, e.g. relatively high amplitude value of the code element as shown in FIGS. 1a and 1b for a half-wave code element, and the other binary value, as "0" is represented by a code element of a relatively small amplitude value as shown in FIGS. 1c and 1d. The polarity of the half-wave code elements is of no importance. FIG. 2 shows as example the code word 1011 made up by the code elements of FIG. 1.

Figure 3A:
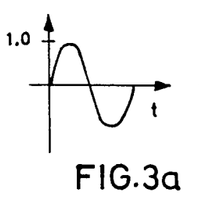
FIGS. 3a to 3d show code elements of a second type which may be used in the present method.
Figure 3B:
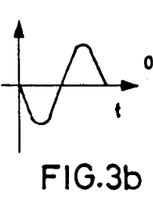
Figure 3C:
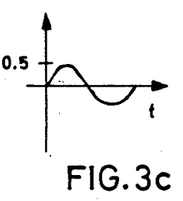
Figure 3D:
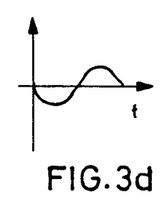
Figure 3E:
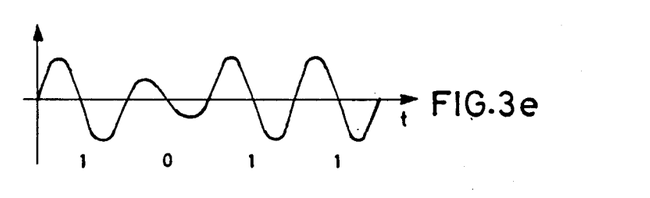
FIG. 3e is an example of a 4-bit code words consisting of code elements shown in FIGS. 3a to 3d.

The binary values 1 and 0 may likewise be represented by code elements in the form of a full period of a sine wave having great and small amplitudes, respectively, as shown in FIGS. 3a, 3b, and 3c, 3d, respectively. In this case, the code word 1011 takes the form shown in FIG. 3e.

The smaller amplitude value is preferably larger than zero and less than half of the large amplitude value.

Figure 4:
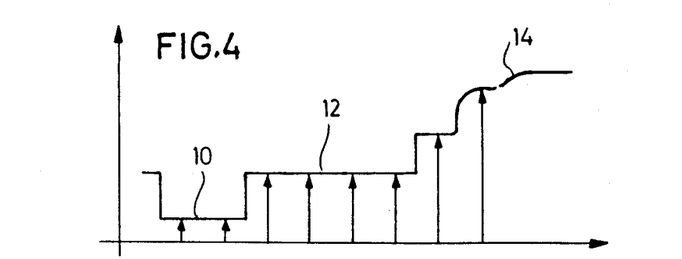
FIG. 4 is a diagram showing an example of a portion of a known analog composite video signal.

A further type of coding which may be termed "analog coding" uses for each code element a full or a half period of a sine wave, the amplitude of which representing the magnitude to be transmitted, e.g. a parameter of an individual picture element (pixel), as the luminance, saturation of a specific primary color, a component color and the like. A pixel is the smallest unit of the picture to be resolved, and the size of the pixel represented by a code word may vary as a function of the information conveyed since color information requires generally less resolution than luminance information as well known in the art. How a composite video signal may be coded using such an analog code will be explained with reference to FIGS. 4 and 5; FIG. 4 depicts an usual black-and-white composite video signal comprising a synchronizing pulse component 10, a blanking component 12, and an image or luminance component 14. This signal is sampled with a frequency corresponding to the pixel frequency and the samples produced, which are shown in FIG. 4 by vertical arrows, are used to control the amplitude of successive half-waves of a sinusoidal a.c. signal, the frequency of which is half the sampling frequency. The pixel frequency is the number of image elements to be resolved which are scanned per unit of time during pickup and reproduction of the image. With the German standard, the pixel frequency may be about 13 MHz, and, thus, the a.c. signal shown in FIG. 5 may have a frequency of 6.5 MHz.

In accordance with a first embodiment of the method according to the invention for transmitting a color picture signal, the synchronizing signal, the blanking signal and the luminance signal are transmitted as usual, i.e. in analog form. The color information is transmitted in form of two color signals coded in accordance with the invention, e.g. a red signal R and a blue signal B. The luminance signal Y is produced as well known, from the primary color signals R, G, and B produced by a color television camera or a telecine apparatus in accordance with the well known equation $$Y = 0.3\,R + 0.59\,G + 0.11\,B.$$

The red color coponent is represented by a first alternating current signal R forming code words of e.g. 5 bits each which represent the value of red saturation of a respective color pixel. The blue color component is represented by an a.c. signal of the same predetermined frequency but phase-shifted by 90 degrees with respect to the red representing a.c. signal, and similarly coded with the value of blue saturation.

Figure 6:
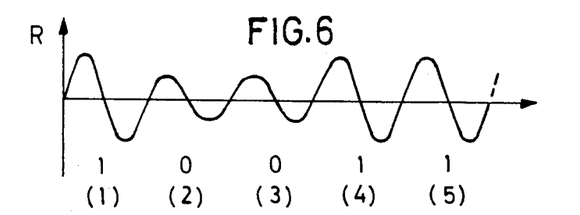
FIG. 6 and 7 show examples of coded red and blue signals, respectively.

FIG. 6 shows a portion of the red signal R which comprises the red saturation information for a red pixel. The exemplary embodiment shown in FIG. 6 uses a five bit binary code capable of coding 32 different values of color saturation. In FIG. 6 a red pixel having a binary saturation value 10011 is shown. Since less resolution is required for color information than for luminance information, a smaller number (e.g. 1/5) color samples (color pixels) than luminance samples may be transmitted per picture line.

Figure 7:
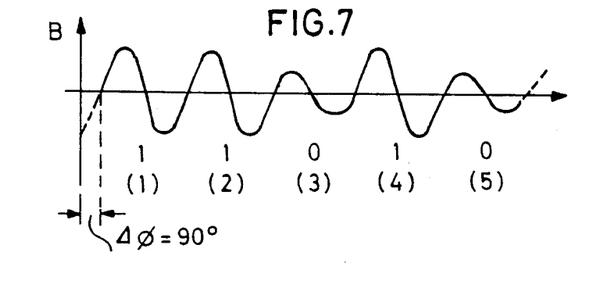

The a.c. signal representing the blue signal is shown in FIG. 7. The blue a.c. signal has the same frequency as the red a.c. signal and a phase differing by 90 degrees from that of the red signal. FIG. 7 shows the blue signal for a color pixel having the binary saturation value 11010. The frequency of the a.c. signals R and B is the color signal sampling frequency, e.g. 1.3 MHz, times the number of bits of a code word of the binary code used.

Figure 8:
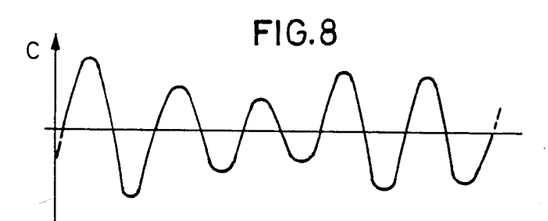
FIG. 8 shows a waveform derived by superimposing the signal waves shown in FIGS. 6 and 7.

The red signal and blue signal representing a.c. signals shown in FIGS. 6 and 7 are combined by superposition to form a single a.c. signal C as shown in FIG. 8. The combined signal may be then transmitted in place of the usual modulated color subcarrier together with the synchronizing, blanking and luminance signal components.

Color errors cannot occur with the above described method of transmission since the phase of the red and blue a.c. coded signals R and B (FIGS. 6 and 7) respectively) are fixed, and the codes are phase-independent.

At the receiving end, the combined a.c. signal C shown in FIG. 8 is demodulated by usual synchronous demodulation to derive the coded color signals R and B. The reference signal necessary for the synchroneous demodulation may be synchronized by a burst having the same frequency as and a predetermined phase relationship in respect to the coded signals R, and B, and transmitted as usual during the blanking period.

It should be obvious to those skilled in the art that other color information signals can be used instead of the above-mentioned red and blue signals, e.g. the reduced color difference signals U and V of the PAL standard, or the signals I and Q of the NCSC standard. Further, a code word may comprise more or less than five bits, if desired.

In accordance with a second embodiment of the present invention which is preferred at present, the color information is conveyed by first and second coded a.c. signals of the type described with reference to FIGS. 6 and 7, said first a.c. signal representing the angle alpha (color angle) of the color vector 20 in the known color circle shown in FIG. 9, and said second coded a.c. signal representing the magnitude or absolute value of the color vector 20. Thus, the coded color angle represents the hue and the coded absolute value M represents the saturation of the specific color pixel. A 9-bit word binary code is preferred for coding the color angle so that 512 different values of the color angle and, thus, 512 different hues can be represented. The second a.c. signal may be coded with a binary code consisting of words of the same number of bits, e.g. 9-bits, as the code representing the hue. However, less code elements per word are needed for coding the color saturation; generally five bits of each 9-bit code word will suffice and the remaining four bits may be used for coded transmission of other signals, e.g. for coding audio or tone information. However, the tone may also be transmitted by coded signals occurring during the blanking period 12 (FIG. 4), e.g. in form of a coded burst.

Figure 5:
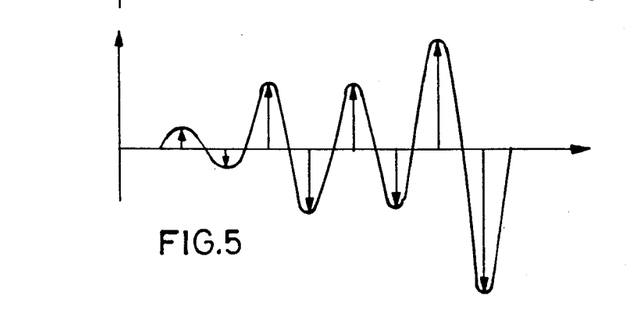
FIG. 5 shows the waveform of an analog coded version of a portion of the composite video signal shown in FIG. 4, the coded signal comprising code elements consisting of a half period of a sine wave as explained with reference to FIG. 1.
Figure 10:
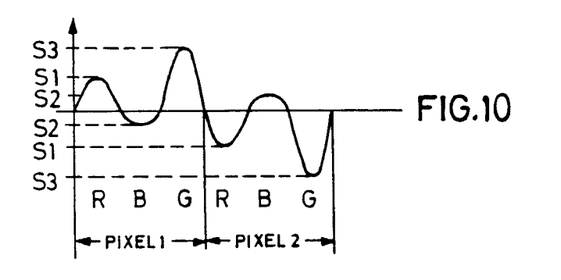
FIG. 10 shows a sequentially coded signal.

In another embodiment of the invention shown in FIG. 10, the primary color signals R, B, and G are sequentially transmitted for each pixel by an analog code of the type described with reference to FIGS. 4 and 5. Thus, in the example shown in FIG. 10, a group of three code elements is transmitted for each pixel, each code element consisting of a half period of a sine wave as explained with reference to FIG. 1. Which color R, G or B is concerned is determined by the position of the code element within each code element triple or word while the saturation of the respective color is represented by the amplitude of the respective code element. Thus, in the example shown in FIG. 10, in each pixel 1, and 2, the first, the red signal, code elements each represent a saturation of magnitude S1, each of the second, the blue signal code elements represent a saturation of the magnitude S2, and each of the third, the green signal code elements represent a saturation of magnitude S3.

In a further embodiment which will now be described with reference to FIGS. 11a and 11b, the luminance signal Y is represented by a first a.c. signal 22 (FIG. 11a) coded in analog fashion as explained with reference to FIGS. 4 and 5, while the red primary signal R, the blue primary signal B and the tone T are represented by triples of elements of an analog code similar to FIG. 3. The second alternating current signal shown in FIG. 11b which is comprised of the code triples or code words RBT has a phase lag of 90 degrees with reference to the luminance a.c. signal 22 of FIG. 11a. The a.c. signals of FIGS. 11a and 11b may be combined by superposition before transmission as explained with reference to FIGS. 6, 7 and 8. It should be evident to those skilled in the art, that the coded a.c. signals may also be transmitted via separate channels.

Figures 11A, 11B:
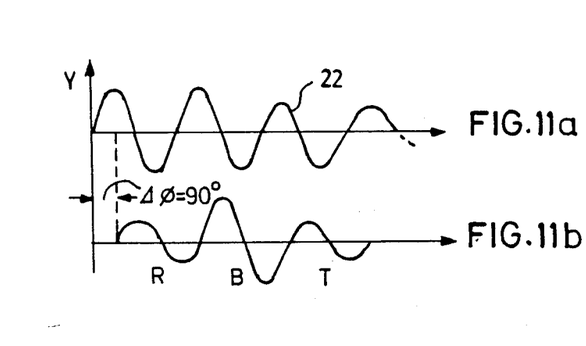
FIG. 11a shows a coded alternating current signal comprising luminance information.
FIG. 11b shows an alternating current signal sequentially coded with red, blue and tone signals.

The embodiment of FIG. 11 provides for a resolution of the luminance signal Y which is three times the resolution of each of the color signal R, B which is desirable, as known.

It should be evident that code elements consisting of a full a.c. period may be used in FIG. 11b instead of the single half-wave code elements. If a full a.c. period is available for each code element, the second, redundant half-wave may be employed for reducing errors or alternatively the color saturation range may be divided in first and second portions which are coded on the first and second half-wave, respectively, of the full period code element.

Figure 12A:
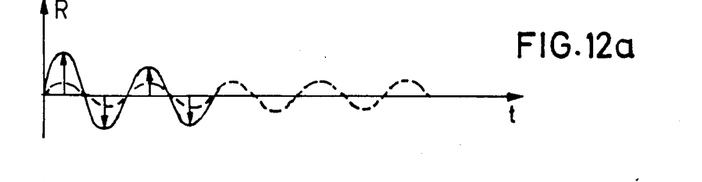
FIGS. 12a, 12b, and 12c show waveforms for explaining measures for avoiding abrupt phase changes.
Figure 12B:
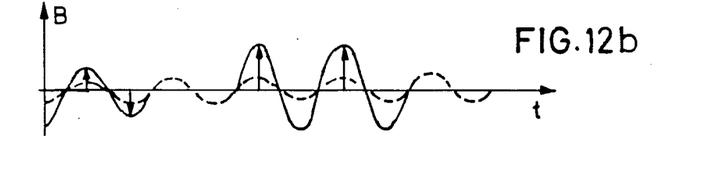
Figure 12C:
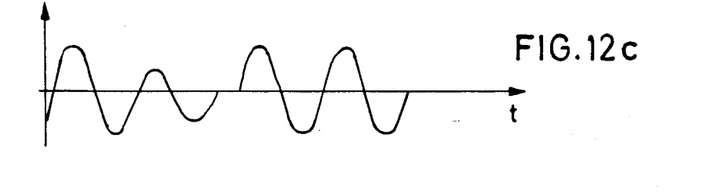

In a further embodiment of the invention, the red signal is coded on a first alternating current signal (FIG. 12a), and the blue signal is coded on a second a.c. signal (FIG. 12b) of the same frequency as the first signal, but on a 90 degree leading phase. The amplitudes of the half-periods of the a.c. signals of FIGS. 12a and 12b represent the color saturations of the red primary color signal and the blue primary color signal, respectively. The a.c. signals of FIGS. 12a and 12b are combined into a signal a.c. signal of the respective frequency before transmission, as shown in FIG. 12c. Other color signals may be used instead of the red and blue signals as explained with reference to FIGS. 6 to 8.

Figure 13A:
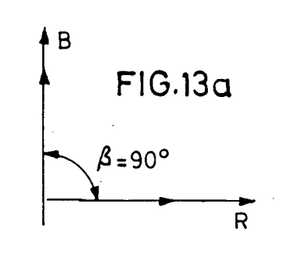
FIGS. 13a and 13b show vector diagrams related with FIGS. 12a and 12b.

As can be seen from FIGS. 12a to 12c and the vector diagram shown in FIG. 13a, that an abrupt phase change of $\beta = 90°$ occurs in the combined signal 12c when the image information changes from an area with some finite red saturation and zero blue saturation to an area with zero red saturation and some finite blue saturation. Such abrupt phase changes can be avoided by adding an a.c. component C1 of constant, small amplitude to the a.c. signal of FIG. 12a and/or by adding an a.c. component C2 of small, constant amplitude to the a.c. signal of FIG. 12b. The amplitude of the constant component C1 and/or C2 may be e.g. 10% of the maximum amplitude of the respective saturation a.c. signal.

Figure 13B:
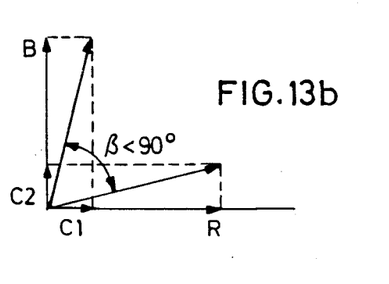

It can be seen from the vector diagram in FIG. 13b, that by adding an a.c. component C1 of constant, small amplitude to the red saturation a.c. signal R and/or by adding a small, constant a.c. component C2 to the blue saturation a.c. signal B, the maximum phase shift is limited and no abrupt changes in the combined signal can occur. The above applies of course also in case that the blue primary signal and the red primary signal (i.e. signals which comprise luminance information) or other color information signal are used instead of the described red and blue saturation signals.

In addition or as an alternative to the described adding of small constant a.c. components, the effect of abrupt phase changes can be reduced by using a plurality of like code elements for each information unit, i.e. for the red or blue pixel information.

Figure 14:
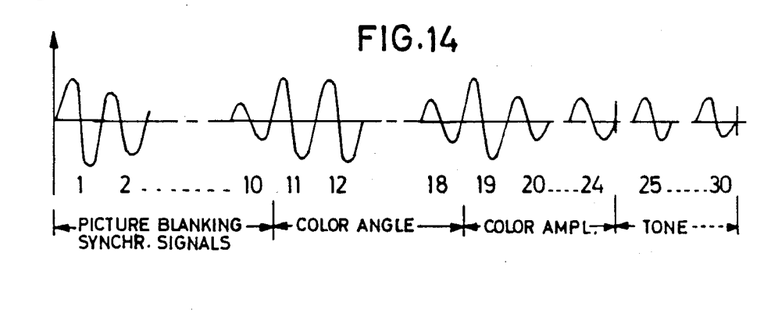
FIG. 14 shows a coded alternating current signal for use in another embodiment of the invention.

In a preferred embodiment of the invention, the frequency of the coded a.c. signal is equal to the frequency of the transmitted signal, i.e. the frequency of the signal that is aired or transmitted by cable from the transmitting end to the receiving end of the system. In this case, the periods or half-waves of the radio frequency transmitted a.c. signal (radio frequency carrier) are directly used as code elements (FIG. 1 and 3). This method is specifically useful for transmitted frequencies in the UHF range, because at least 30 a.c. periods are available for coding each picture element when signals of such high frequencies are used. Thus, e.g. the first 10 periods of each pixel code word may be used for digitally coding the synchronizing blanking and luminance signals, the periods 11 to 18 for digital coding of the hue the periods 19 to 24 for coding the color saturation and the remaining periods for coding one or a plurality of tone versions and other additional information, as text or newspaper displays and the like. FIG. 14 is a simplified depiction of the portions of one code word of a signal of the above described type.

Figure 15A:
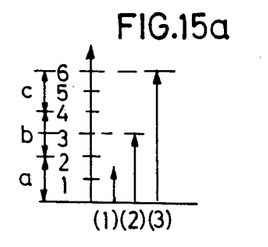
FIGS. 15a and 15b are diagrams for explaining a specific type of analog coding.
Figure 15B:
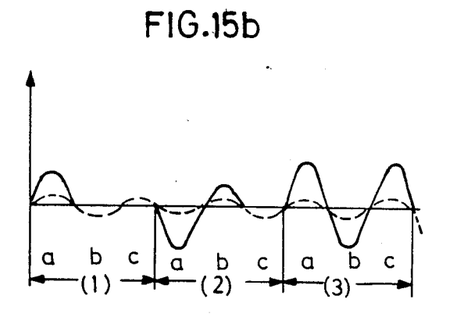

With reference to FIGS. 15a, and 15b measures will now be described by which the resolution obtainable with analog coding can be improved. FIG. 15a shows three signal samples (1), (2) and (3) having the values 1,5, 3, and 6, respectively. It is assumed in this example, that the value 6 is the maximum possible value of a sample. In accordance with this aspect of the invention, the value range of 0 to 6 is divided in partial ranges 0 to 2, 2 to 4, and 4 to 6, and one half-wave of the code a.c. signal is assigned to each partial range to represent the signal value within the respective partial range. Thus, the code group for sample (1) of value 1.5 comprises a first half-wave having the amplitude value 1.5, and second and third half-waves each having the amplitude value 0, as shown in FIG. 15b. The code group for sample (2) of value 3 comprises a first half-wave having the maximum value 2, which a coded half-wave can have in this example, the second half-wave has the value 1 and the third half-wave has the value 0. The code group of sample (3) of the maximum value 6 comprises three half-wave waves which each have the value 2, as shown in FIG. 15b. Of course, only two half-waves of more than three half-waves may be used for coding each sample.

The type of analog coding described above with reference to FIGS. 15a and 15b is specifically useful for coded transmission of luminance signals and of primary color signals (which comprise both color and luminance information), it is of course not limited to these signals.

A small a.c. component of constant amplitude (dashed waveform) may be added to the code signal of FIG. 15b as explained with reference to FIGS. 12a and 12b.

Figure 9:
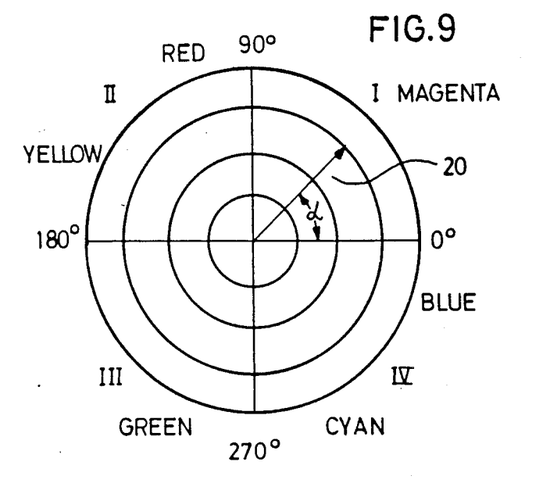
FIG. 9 shows a known color circle.
Figure 16:
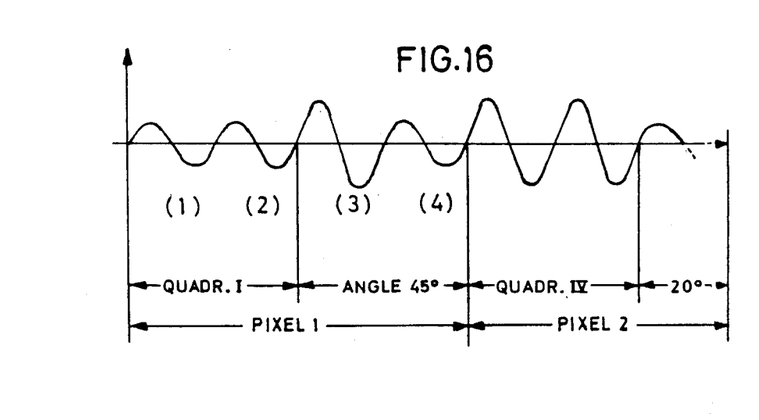
FIG. 16 shows an alternating current signal coded with hue information.

A further method for coded transmission of color television signals based on the color circle of FIG. 9 is shown in FIG. 16. The color circle is divided in four quadrants I, II, III, IV. The angle alpha of the color vector 20 of a predetermined pixel or information element is coded by a group of four code elements which may be half-waves or full periods as shown in FIG. 16 (to obtain the advantage of a d.c. free signal which is less likely effected by noise). The first two code elements (1) and (2) form a 2-bit-binary code indicating the quadrant which comprises the color vector 20. Thus, for quadrant I, this code portion has a value 00. the next two code elements (3) and (4) are used for coding of the color vector angle referenced to the smallest angle of the respective quadrant, i.e. 0°, 90°, 180°, and 270°. The code element (3) is used for coding values of 0° to 45° while the code element (4) is used for coding values between 45° and 90°. Thus, the angle of the code vector 20 in FIG. 9, which is 45°, is coded by a first code element (3) having a maximum value corresponding to 45°, while the second code element (4) has the minimum value corresponding to 0°. An angle of 22.5° would be coded by a code element (3) of half of the maximum value and a code element (4) of value 0, and an angle value of 75° would be coded by a code element (3) of maximum value and a code element (4) of $\frac{2}{3}$ of the maximum value.

The color saturation corresponding to the magnitude M of the color vector 20 may be coded by a second a.c. signal shifted by 90 degrees in phase with respect to the color angle coding a.c. signal as explained above. Since generally two code elements suffice for coding the saturation, two code elements of each pixel word are free and may be used for other information as tone. The above method may be modified by using a single a.c. signal consisting of a series of code words which each comprise angle and saturation and, if desired further information, in subsequent word portions as explained with reference to FIG. 14.

In the above examples, full period code elements may be used instead of half-period code elements and vize versa.

Techniques well known in the color television art may be used to produce the signals to be coded, as the chrominance, luminance, primary color and synchronizing signals and so on, to combine two quadrature phase a.c. signals into a combined signal, to transmit the complete composite color television signal to the receiver, and to perform the corresponding complementary operations on the receiving side.

Figure 17:
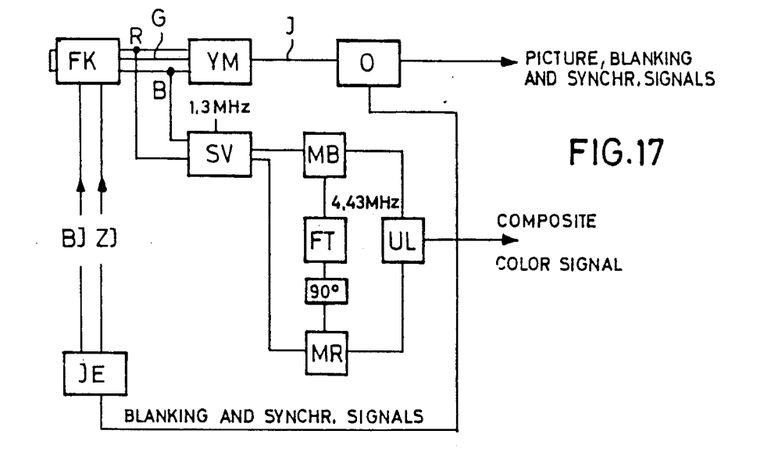
FIGS. 17-21 show circuit diagrams in block form of circuits useful for implementing the invention.

FIG. 17 shows a circuit which may be used at the transmitting side. Generally, the analog signals are generated as usual in the color television art, e.g. by a television camera FK producing red, green and blue primary color signals R, G, B applied to an luminance signal matrix YM producing a luminance signal Y. Television camera FK receives vertical and horizontal synchronizing pulses BJ and ZJ, respectively from a master pulse generator unit JE, which also produces the necessary blanking and synchronizing signals A and S, respectively, for the signal to be transmitted.

The blue and red primary color component signals are sampled in a sampling unit SU with a rate of 1.3. MHz and the samples produced are applied to modulators MB and MR, respectively which receive quadrature carrier waves of 4.43 MHz from stage FT directly, and through a 90 degree phase shifter, respectively. The modulated blue and red signals are combined by superposition in UL to produce a chrominance signal F. The blanking and synchronizing signals A and S, and the luminance signal Y are applied to a combining unit 0 to produce a signal BAS comprising luminance, blanking and synchronizing information.

Figure 18:
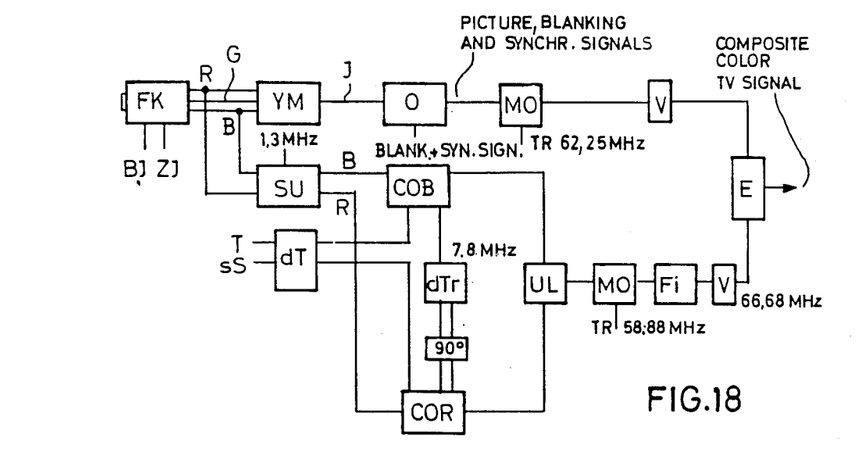

In the system shown in FIG. 18, the BAS signal is produced as usual. The color component signals B and R are sampled with a rate of 1.3 MHz. Five code elements, thus five bits are assigned to each period of the B or red signals (1.3 MHz). Thus, 7.8 MHz are necessary for coding if one additional bit is assigned to the tone and other signals sS. The blue and red signals are coded in coders COB, and COR in accordance with FIG. 3. The coded signals are superimposed in UL, and applied to a modulator MO together with a carrier of 58.88 MHz. The carrier and the lower side band is selected to filter Fi, thus, a coding frequency of about 66.68 MHz is passed through an amplifier V to decoupler E. The luminance signal Y is produced in a matrix YM and applied to a multiplexing or combining circuit O which also receives the blanking and synchronizing signals A, S. During the blanking period, the Y signal is switched off. The BAS signals are applied to a modulator MO together with a carrier of 62.25 MHz, and the modulated signals are applied through amplifier V and a decoupler E to a power stage (not shown). The distance between 62.25 MHz and 66.68 MHz is 4.43 MHz or, more specifically, a usual standardized color subcarrier frequency.

Figure 21:
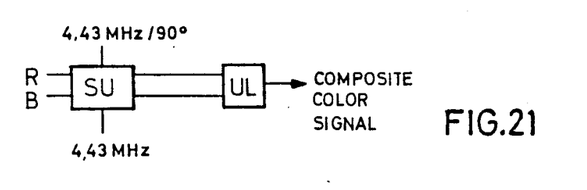

As shown in FIG. 21, the blue and red signals may alternatively directly processed with 4.43 MHz.

Figure 19:
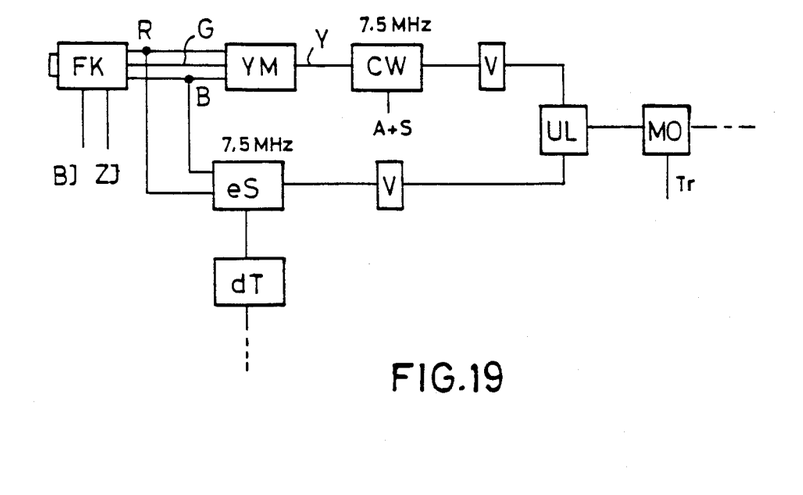

In the system of FIG. 19, red, blue, and digital tone signals R, B, and dT, respectively are sampled in eS with a rate of 7.5 MHz. The luminance signal Y is processed in the same way. The coded alternating currents both from CW and from ES, which are phase-displaced by 90 degrees, are applied through amplifiers V to superimposing unit UL. The combined alternating current produced by UL is applied to modulator MO which further receives a carrier wave Tr.

Figure 20:
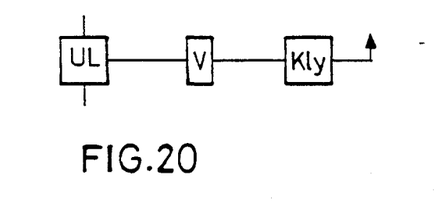

As shown in FIG. 20, the combined superimposed alternating current may be directly used as radio frequency wave to be transmitted, thus, unit UL is coupled through driver amplifier V to a transmitting stage Kly which may comprise a klystron.

While I have shown and described preferred embodiments of my invention, it will be apparent to those skilled in the art that many changes and modifications may be made without departing from my invention in its broader aspects. I therefore intend the appended claims to cover all such changes and modifications as falls within the true spirit and scope of my invention.

I claim:

1. A method of transmitting a composite color image signal comprising first and second component signals having first and second color representing properties, respectively, said method comprising the steps of
   (a) sampling said first component signal at sampling times recurring with a predetermined period to produce a first train of first samples;
   (b) sampling said second component signal at sampling times recurring with said predetermined period to produce a second train of second samples;
   (c) coding said first train of samples by assigning to each of said first samples a first code element comprising at least one half-period of a sine wave of predetermined frequency, each of said first half-period sine wave code elements having an amplitude representing said first color property of said first component signal at the respective sampling time;
   (d) forming a first continuous sine wave having said predetermined frequency and comprising said first code elements;
   (e) coding said second train of samples by assigning to each of said second samples a second code element comprising at least one half-period of a sine wave of said predetermined frequency, each of said second half-period sine wave code elements having an amplitude representing said second color property of said second component signal at the respective sampling time;

(f) forming a second continuous sine wave having said predetermined frequency and comprising said second code elements; said second sine wave being in phase quadrature with respect to said first sine wave;

(g) adding a constant amplitude sine wave of said predetermined frequency to one of said continuous sine waves to form a sum sine wave, said constant amplitude being a fraction of a maximum amplitude of said composite wave, to reduce the amount of abrupt phase variations;

(h) Superimposing said sum wave and the other of said continuous sine waves to form a combined sine wave;

(i) including said combined sine wave in said signal to be transmitted (FIGS. 12a–c).

2. A method of transmitting a composite color image signal comprising first and second component signals having first and second color representing properties, respectively, said first color representing property having values within a predetermined range of values, said method comprising the steps of (a) sampling said first component signal at sampling times recurring with a predetermined period to produce a first train of first samples;

(b) sampling said second component signal at sampling times recurring with said predetermined period to produce a second train of second samples;

(c) coding said first train of samples by assigning to each of said first samples a code group comprising a plurality of first code elements, each of said first code elements comprising at least one half-period of a sine wave of predetermined frequency, wherein said first half-period sine wave code elements are comprised in a code group having an amplitude representing different portions of said range of values of said first color property at the respective sampling time, the consecutive sine wave code periods of each code group representing, taken together, said predetermined range of values;

(d) coding said second train of samples by assigning to each of said second samples a code comprising at least one half-period of a sine wave of said predetermined frequency, each of said second half-period sine waves having an amplitude representing said second color property of said second component signal at the respective sampling time;

(e) including said code groups and codes in said signal to be transmitted.

3. A method of transmitting a composite color image signal comprising red and blue color component signals representing the color amplitude of the respective color component of the image to be transmitted, said method comprising the steps of (a) sampling said red color component signal at sampling times recurring with a predetermined period to produce a train of red signal samples;

(b) sampling said blue color component signal at sampling times recurring with said predetermined period to produce a train of blue signal samples;

(c) coding said red signal samples by assigning to each of said red signal samples a first multibit binary code representing the color amplitude of the red signal at the respective sampling time, the bits of said first codes being represented each by at least one half-period of a sine wave of predetermined frequency, each of said half-period sine waves representing a predetermined bit having first or second amplitudes representing first and second bit values, respectively;

(d) forming a first continuous sine wave having said predetermined frequency and comprising said first codes;

(e) coding said blue signal train samples by assigning to each of said blue signal samples a second multibit binary code representing the color amplitude of the blue signal at the respective sampling time, the bits of said second codes being represented by at least one half-period of said sine wave of said predetermined frequency, each of said halfperiod sine waves representing a predetermined bit having said first or second amplitude corresponding to the value of said bit;

(f) forming a second continuous sine wave having predetermined frequency and comprising said second code elements, said second sine wave being in phase quadrature with respect to said first sine wave;

(g) superimpsoing said first and second continuous sine waves to form a combined sine wave;

(h) including said combined sine wave in said signal to be transmitted (FIGS. 6, 7 and 9).

4. A method of transmitting a composite color image signal comprising first and second component signals representing color angle and color amplitude, respectively, of said image, said method comprising the steps of (a) sampling said first component signal at sampling times recurring with a predetermined period to produce a first train of first samples;

(b) sampling said second component signal at sampling times recurring with said predetermined period to produce a second train of second samples;

(c) coding said first train of samples by assigning to each of said samples a first multi-bit binary code representing the color angle of said first component signal at the respective sampling time; each bit of said codes being represented by a code element comprising at least one half period of a sine wave of predetermined frequency, a first amplitude of said half-period sine wave representing a first bit value and a second amplitude of said half-period sine wave representing a second bit value;

(d) forming a first continuous sine wave having said predetermined frequency and comprising said first codes;

(e) coding said second train of samples by assigning to each of said second samples a second multi-bit binary code representing the color amplitude at the respective sampling time; each bit of said codes being represented by a code element comprising at least one half-period of a sine wave of said predetermined frequency and of one of said first and second amplitudes representing said first and second bit value, respectively;

(f) forming a second continuous sine wave of said predetermined frequency comprising said second codes; said second continuous sine wave being in phase quadrature with respect to said first sine wave;

(g) superimposing said first and second continuous sine waves to form a combined sine wave, and (h) including said combined sine wave in said signal to be transmitted (FIGS. 6, 7, and 9).

5. A method of transmitting a composite color image signal comprising first and second component signals representing first and second color properties, respectively, said method comprising the steps of (a) sampling said first component signal at sampling times recurring with a predetermined period of time to produce a first train of first samples;

(b) sampling said second component signal at sampling times recurring with said predetermined period of time to produce a second train of second samples;

(c) coding said first train of samples by assigning to each of said first samples a first multi-bit binary code representing said first color property of said first component signal at the respective sampling time, each bit of said codes being represented by a code element comprising at least one half-period of a sine wave of a predetermined frequency, a first amplitude of said half-period sine wave representing a first bit value and a second amplitude of said half-period sine wave representing a second bit value;

(d) coding said second train of samples by assigning to each of said second samples a second multi-bit binary code representing said second color property of said second component signal at the respective sampling time;each bit of said second codes being represented by a code element comprising at least one half-period of a sine wave of said predetermined frequency and having one of said first and second amplitudes representing said first and second bit values, respectively;

(e) forming a continuous, essentially sinusoidal waveform signal comprising said first and second codes in interlaced relationship wherein at least 30 A.C. UHV frequency periods are provided for coding information of each picture element of said color image;

(f) including said continuous waveform signal in said signal to be transmitted (FIG. 14).

6. The method as claimed in claim 5, wherein said composite signal comprises at least one further component signal, said method comprising the additional steps of (g) sampling said additional component signal at sampling times recurring with said predetermined period of time to produce a train of third samples;

(h) coding said third train of samples by assigning to each of said third samples a third multi-bit binary code, the bits of said codes being represented by a code element comprising at least one half-period of said sine wave of predetermined frequency and having one of said first and second amplitudes representing said first and second bit values, respectively;

(i) interlacing said third codes with said first and second codes to produce said continuous, essentially sinusoidal waveform (FIG. 14).

7. The method as claimed in claim 5, wherein said predetermined frequency is a high frequency adapted for transmission as a radio frequency wave by a transmitter.

8. A method of transmitting a composite color image signal comprising a luminance signal and first and second component signals representing first and second color properties, and a third component signal, said method comprising the steps of (a) sampling said first component signal at sampling times recurring with a predetermined period of time to produce a first train of first samples;

(b) sampling said second component signal at sampling times recurring with said predetermined period of time to produce a second train of second samples;

(c) coding said first train of samples by assigning to each of said first samples a first code element comprising at least one half-period a sine wave of predetermined frequency, each of said first half-period sine wave code elements having an amplitude representing said first color property of said first component signal at the respective sampling time;

(d) coding said second train of samples by assigning to each of said second samples a second code element comprising at least one half-period of a sine wave of said predetermined frequency, each of said second half-period sine wave code elements having an amplitude representing said second color property of said second component signal at the respective sampling time;

(e) generating third code elements representing said third component signal, each of said third code elements comprising at least one half-period of said sine wave of predetermined frequency;

(f) forming a first continuous, essentially sinusoidal waveform signal having said predetermined frequency and comprising said first, second and third code elements in interlaced relationship;

(g) sampling said luminance signal at sampling times recurring with said predetermined period of time to produce a train of luminance samples;

(h) coding said luminance samples by assigning to each luminance sample a luminance code element comprising at least one half-period of said sine wave of predetermined frequency;

(i) forming a second continuous, essentially sinusoidal waveform signal comprising said luminance code elements and having a phase which is in quadrature with respect to the phase of said first continuous, essentially sinusoidal waveform signal;

(j) superimposing said first and second continuous signals to form a combined sine wave; and (k) including said combined sine wave comprising said first and second continuous sine waves in said signal to be transmitted.

9. A method as claimed in claim 8, wherein said first and second component signals are first and second color signals selected from the group of signals comprising a red color signal, a green color signal and a blue color signal, and wherein said first and second color properties are the color amplitudes of said selected first and second color signals, respectively (FIG. 10).

10. The method as claimed in claim 8, characterized in that said first and second component signals are first and second color signals selected from the group of signals comprising a red color signal, a green color signal and a blue color signal; said first and second color properties being the color amplitudes of said selected first and second color signals, respectively, and wherein said third component signal is an audio signal (FIG. 11*b*).

* * * * *